Jan. 25, 1938.  F. J. KURTH  2,106,458

AIR DISTRIBUTING DEVICE

Filed Dec. 23, 1935

INVENTOR
FRANZ J. KURTH.
BY
ATTORNEY

Patented Jan. 25, 1938

2,106,458

UNITED STATES PATENT OFFICE 2,106,458

AIR DISTRIBUTING DEVICE

Franz J. Kurth, New York, N. Y., assignor to Anemostat Corporation of America, a corporation of Delaware Application December 23, 1935, Serial No. 55,723

2 Claims. (Cl. 98—40)

My invention relates to ventilating apparatus and more particularly air distributing devices, whereby air is introduced into a room without any sensation of draught being experienced by the occupants of the room. Such air distributing devices are intended to distribute the air in all directions while simultaneously reducing the energy of flow of the air current, which is accomplished by the air current being divided into a number of separate individual currents for which separate individual air passages of gradually increasing cross-section are provided. Such air distributing devices are fully disclosed in Patents 1,926,794, 1,926,795 and 1,973,490 issued to me respectively on September 12, 1933 and September 11, 1934.

In said air distributing devices, the air-distributor so-called is composed of a plurality of mutually spaced hollow flaring members which, as shown in Patent 1,926,794, are either located in front of one another in the direction of the longitudinal axis of the device, the walls of said members forming obtuse angles with said axis, or, as shown in Patents 1,926,795 and 1,973,490, are in nested arrangement with each other.

In any of these cases, that is to say, whether the mutually spaced hollow flaring members are disposed in front of one another or are in nested arrangement with each other, the air is thereby divided into a number of concentric separate air currents radiating in all directions from a common central axis.

The air distributing device according to the present invention is based more or less on the same principle involved in the air distributing devices of the above mentioned patents in that the supply of air is divided into a number of separate individual air currents flowing through separate individual passages gradually increasing in cross-section toward the discharge end. In accordance with this invention, however, the separate air passages are not concentrically grouped about a common central axis resulting in radial air currents radiating in all directions from said central axis, but the individual air passages are so formed as to be juxtaposed or contiguous to one another, the distributor having a honey-comb appearance, except that the separate passages are of gradually increasing cross-section toward the discharge end.

In the air-distributing device according to the present invention, therefore, the air-distributor proper comprises a number of contiguously disposed hollow members or ducts extending outwardly from an air-inlet or air-conduit, and gradually increasing in width from the air-inlet or air-conduit outwards. While the said hollow members may have any desired shape, or be of any desired cross-section, I preferably make them of quadrangular cross-section widening toward the outlet so that the hollow members will have the shape of the frustum of a pyramid, for instance, with the smaller end directed toward the air inlet or air-conduit and with the larger end outwardly directed. But any other desired shape, e. g. that of a prismatoid, may be given to the hollow members, or they may be of frusto-conical shape, or they may also be of angular cross-section. Whatever be the shape of the hollow members or individual passages, the dividing partition walls of adjoining members or ducts are common walls of such adjoining members or ducts. If desired, of course, the hollow members constituting the units of the air-distributor can be separately constructed and assembled into a compact closely fitting structure.

With a distributor thus constructed, unequal volumes of air can be delivered through the hollow members or ducts, some being designed to distribute a larger amount of air while some distribute a smaller amount of air. Also, predetermined volumes of air can be distributed by the inlet ends of the hollow members or ducts by being made correspondingly larger or smaller.

For the purpose of a fuller understanding of my invention, I have illustrated various embodiments of the same on the herewith appended drawing, on which Fig. 1 is a perspective view of my new air distributing device, some of the separate air ducts being shown in broken lines; Fig. 2 is a bottom view of Fig. 1, looking toward the air conduit; Figs. 3 and 4 are similar bottom plan views of modified constructions.

In the embodiment of my new air distributing device shown in Fig. 1, the air-inlet or air-conduit is shown at 1. At 2, 3, 4 etc., are indicated hollow members or passages of widening cross-section connected to, and terminating in, the said air-conduit 1 with their smaller ends and projecting outwardly therefrom with their larger ends. In the embodiment shown in Fig. 1, the hollow members have the shape of a frustum of a pyramid and are contiguously disposed, so that the distributor when viewed from the bottom has the appearance of a honey-comb. When the device is used for the distribution of air, the air supplied to the air-inlet 1 flows through the various hollow members or passages in the direction of the arrows, being divided by said members or passages into a corresponding number of separate individual air currents. The inlet size of the several hollow members or passages is made for the distribution of either equal or unequal amounts of air to be supplied to the various members or passages. In either case, the energy of flow of these separate individual air currents is being decreased toward the outlet ends of the members because of their gradually widening cross-section. The number of the hollow members or passages, their size and length are determined by the volume of air to be supplied during a given unit of time. Also a means may be provided for either partly or entirely closing one or more of the hollow members and passages to thereby prevent a current of air from passing therethrough or to regulate the volume of the air current. Such a means is shown in Fig. 1, where 5 denotes a damper designed to partially or wholly close the inlet end of one of the hollow members or passages.

Figure 1:
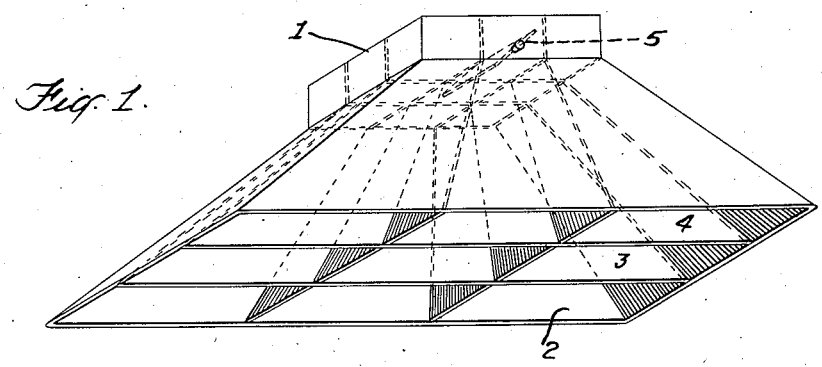
Figure 4:
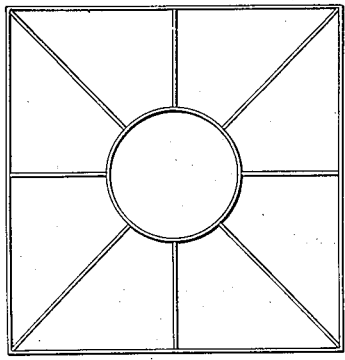
Figs. 3 and 4 are similar views as Fig. 2, showing modifications of the hollow members, which according to Fig. 3 are of angular shape, while according to Fig. 4, they are of irregular shape.
Figure 2:
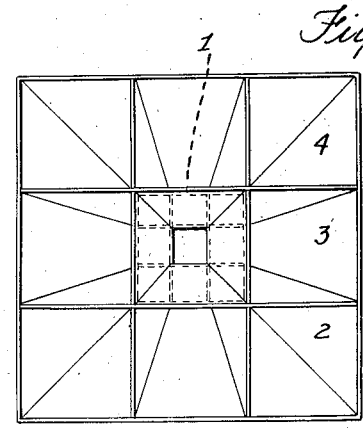
Fig. 2 shows a bottom view of the device shown in Fig. 1 looking in the direction toward the air-inlet or air conduit 1.
Figure 3:
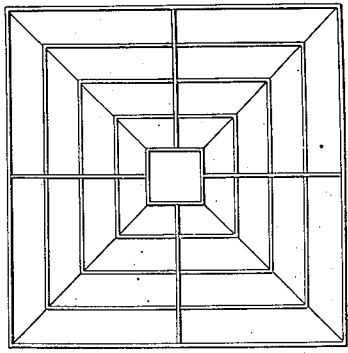

In either of these modified embodiments, however, the hollow members or passages are likewise contiguously disposed having common partition walls, and are also of increasing cross-section toward their outlet or discharge ends.

Unnecessary to say, the air-distributor instead of being composed of a plurality of separate individual hollow members may also be made of a single solid piece in which ducts of corresponding shape and cross-section are formed.

I claim:

1. In an air distributing device, the combination of a flaring truncated hollow casing and a plurality of intersecting partitions extending through said casing in fixed relation thereto and to each other and being so disposed as to divide said casing into a plurality of flaring truncated closed ducts open at their ends for the distribution therethrough of predetermined invariable volumes of air.

2. The combination as specified in claim 1, in which the inner and outer ends of said partitions are situated in common planes with the inner and outer edges of the casing respectively.

FRANZ J. KURTH.